May 15, 1962 L. W. PARMATER 3,034,337
TESTING DEVICE FOR AIR CLEANERS OF INTERNAL COMBUSTION ENGINES
Filed June 18, 1959
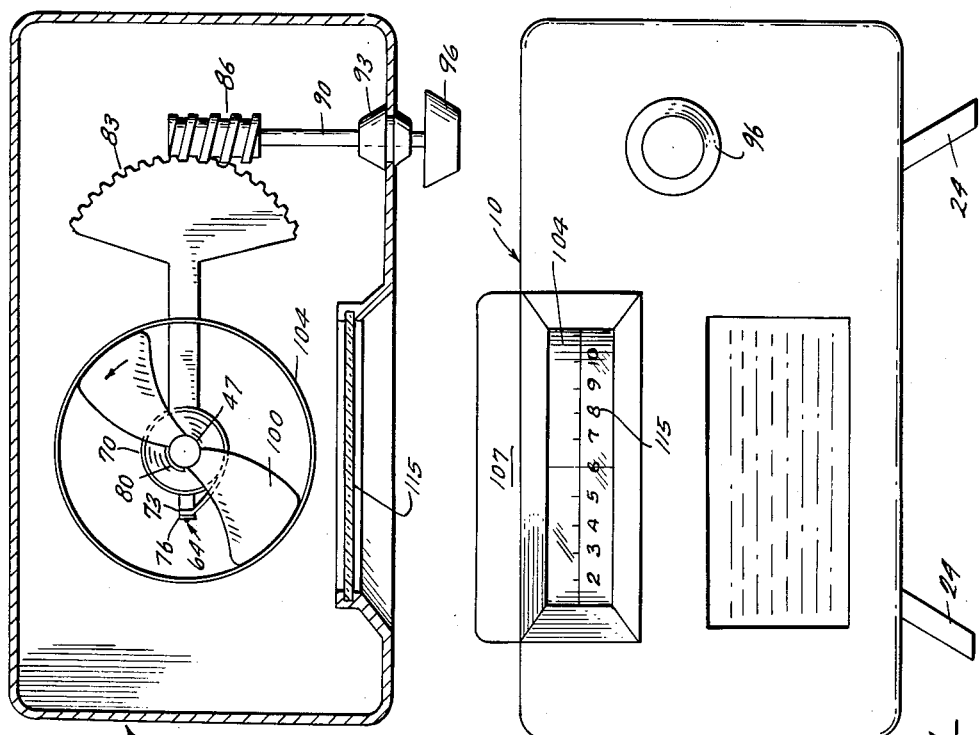
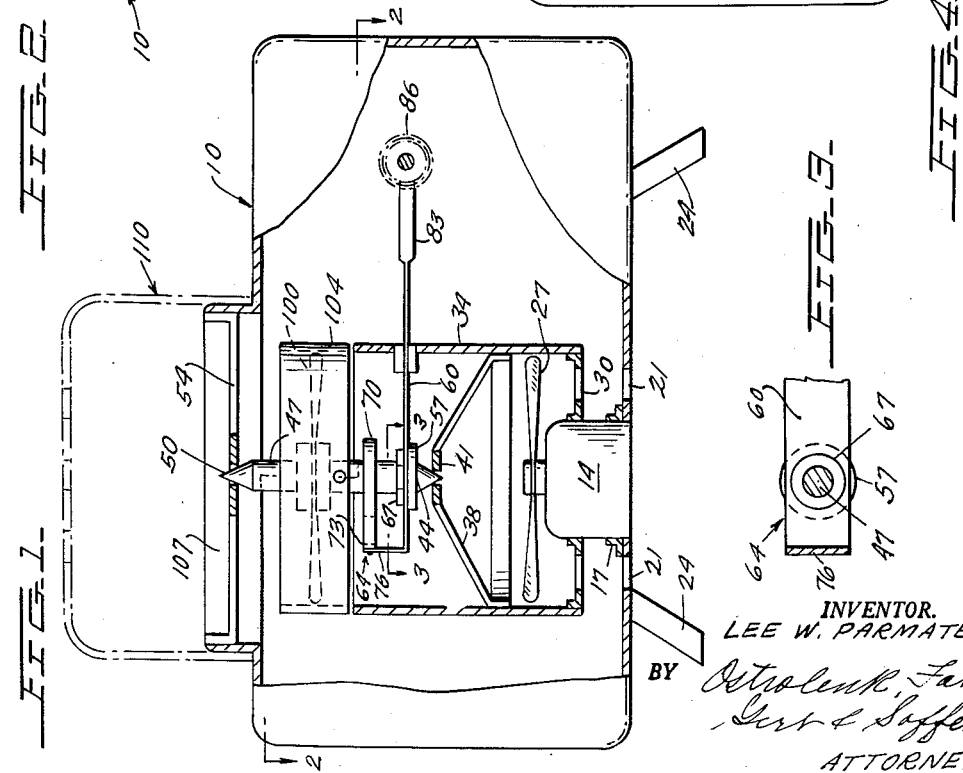
INVENTOR.
LEE W. PARMATER
BY
ATTORNEYS

United States Patent Office 3,034,337
Patented May 15, 1962

3,034,337
TESTING DEVICE FOR AIR CLEANERS OF INTERNAL COMBUSTION ENGINES
Lee W. Parmater, 10131 Riverview Drive, R.R. 1, Plainwell, Mich.
Filed June 18, 1959, Ser. No. 821,264
7 Claims. (Cl. 73—38)

This invention relates to internal combustion engine air cleaners and more particularly to a device for testing the degree of air passage therethrough, dependent upon extent of use and dirt and dust picked up by the filter element.

It is a well known fact that air cleaners require changing or cleaning of the filters from time to time, depending upon the amount of clogging of the filter. Thus, where the filter element of the air cleaner has been heavily clogged, the amount of air flow therethrough is materially reduced with deleterious operating results insofar as the engines is concerned. In order to ascertain just when a filter should be cleaned, or in the case of certain types of filters, replaced, it is desirable to have means for effecting a reliable quantitative test to determine the degree of air flow which the filter passes. My invention relates to a device for apprising an operator of the condition of the filter by means of an actual air flow test therethrough.

It is an object of the invention to provide a simple, compact, rugged and economical apparatus which can be conveniently and quickly operated for the purpose of determining a reasonably accurate degree of effectiveness of an air cleaning filter.

It is another object of the invention to provide a device which is versatile in nature in that it may be readily calibrated for testing various kinds of cleaners.

It is a further object of the invention to provide a device which may be easily adjusted to compensate for certain variations in atmospheric pressure where air under such pressure is utilized for testing purposes and where the ambient pressure of such air may vary from day to day or from locale to locale. Such adjustment means may also compensate for other factors, for example, varying line voltage of a motor for driving a fan which is a component of the combination.

Other objects and features of my invention will be apparent from the description to follow.

Briefly, my invention comprises a device which provides an air tunnel through which air is pulled, and at the entrance to which tunnel an air cleaner having a filter to be tested may be disposed. A motor and fan is utilized for effecting air flow through the tunnel, pulling such air through the filter. Within the tunnel there is disposed, preferably between the motor driven fan and the filter, a reaction element in the form of a propellor blade or a fan blade or blades, which is biased by a spring against rotation. Thus, the greater the discharge rate of air through the tunnel, the greater the torque effect on the reaction fan blade, and the greater the degree of rotation thereof against the counter-rotating biasing of the spring. A scale readable by an operator is carried by the reaction fan blade and the mass rate of air passing the fan blade for effecting a certain degree of rotation thereof may be determined by reading the scale. Thus, the scale may be calibrated for a particular type of filter and used in conjunction with a printed chart so that a scale reading can be interpreted by means of the chart in terms of degree of clogging of the air filter. Obviously, variations of scale reading and mode of interpretation are possible and, in fact, interpretative symbols may be applied to the scale. Further, the scale may be calibrated for various types of filters.

An initial setting of the scale can be achieved by an adjustment means comprising a worm gear and pinion for setting the fixed end of the spring at a particular position so as to effect initial rotation of the reaction fan blade to a starting position prior to air passage therethrough, to compensate for ambient air pressure, fan motor voltage variation, etc.

A detailed description of my invention will now be given in conjunction with the appended drawing in which:

FIGURE 1 is an elevation shown partially cut away and in section and illustrating the essential components of the invention.

FIGURE 2 is a sectional plan view taken generally on 2—2 of FIGURE 1.

FIGURE 3 is a section through 3—3 of FIGURE 1; and

FIGURE 4 is an exterior view in elevation of the device.

Referring now to the drawing, the invention comprises a housing 10 which, in the cut-away front view of FIGURE 1 contains an electric motor 14 suitably located and secured as by a base ring 17 to the bottom of the housing as shown. The bottom of the housing is apertured as at 21 to permit air flow therethrough. Such apertures will be understood to be arranged in a complete ring around the motor base and of suitable size so as to not impede air flow. Further, the housing stands on feet 24 to further facilitate passage of air from the bottom of the housing outwardly thereof. The motor rotates a suction fan 27 and the motor body may support a grille or spider 30 suitably apertured as shown and carrying an air tunnel cylinder 34. Thus, the spider 30 is generally ring-like and of U cross-section so as to have inner and outer peripheral flanges for spot welding or other suitable type of attachment to, respectively, the motor body and the air passage cylinder 34.

Located within the air passage cylinder is a spider or bracket 38 which may have two or more legs secured to the inner walls of the cylinder and having an apertured hub 41 for supporting a tapered trunnion 44 at the lower end of a shaft 47.

The upper end of the shaft has a similar tapered trunnion 50 engaged within an aperture of an upper bracket or spider 54. Thus, it will be apparent that shaft 47 is mounted for rotation on low friction bearings and, in fact, the bearing arrangement should be such as to be as frictionless as possible. The lower portion of the shaft carries a collar 57 on which rests the lower leg 60 of an angle bracket 64. The leg 60 is suitably apertured for shaft 47 and rests on collar 57, and is fastened non-rotatively with respect to the shaft by means of a nut 67 which will be understood to co-act with a threaded portion of the shaft. Thus, for all practical purposes, the shaft 47 and the bracket 64 are integrally attached.

Encompassing the shaft is a spiral hair spring 70 having its outer end attached at 73 to an upright leg 76 of angle bracket 64 and its inner end secured at 80 to the shaft 47. The mode of securement of the spring ends may be accomplished in any conventional manner as by welding, clipping, or otherwise, in accordance with designers' choice. The leg 60 is extended to terminate in a worm gear segment 83 which engages a worm 86 on a shaft 90 supported in a suitable collar 93 carried in the front panel of the housing, the outer end of the shaft carrying a knob 96. It will thus be apparent that rotation of knob 96 will swing leg 60 in either direction and thus, through the spring, will likewise rotate shaft 47 to any desired degree.

At the upper end of shaft 57 a reaction fan blade 100 is carried, which fan blade will be understood to be keyed to the shaft in any suitable manner and encompassing the tips of the blade is a scale ring 104 which may be calibrated in any suitable manner to read degrees of rotation of shaft 47 or directly calibrated to read percentage of clogging of an air filter, etc. The mode of calibration may be by direct comparison with a new filter, relative rates of flow being noted.

The top of the casing is fashioned with a locating flange ring 107 and it will be apparent from FIGURE 1 that an air cleaner, generally indicated as 110 and shown in phantom lines, may be disposed on the casing top and located by means of the flanged locating ring 107.

Preferably, the pitch of the reaction fan blade 100 is opposite to the pitch of the fan 27 for cutting down vibration. Also, the spring 70 may be impregnated with a silicon grease to minimize flutter and hunting.

In operation, after an air cleaner has been placed on the housing, the motor 14 is switched on and the ensuing suction forces air through the filter past reaction blade 100 through the tunnel and out the bottom of the casing. The reaction blade will experience a twist due to impingement of air flow thereof, the degree of twist depending on mass rate of flow. Such degree of twist may be read on the scale 104 by an operator peering through a glass window 115 suitably set in the front panel of the casing as indicated in FIGURES 2 and 4. It is obvious that the condition of the filter can be determined from the amount of twist of the blade, which is in turn dependent upon the amount of air which passes through the filter. Various arrangements for effecting convenience in determining filter condition are expedient. Thus, as indicated above, the scale may be calibrated for various kinds of filter in arbitrary numbers which are then interpreted from a chart conveniently attached to the front panel as indicated at FIGURE 4. Various other arrangements are possible such as direct calibration of the scale for one type of filter or for several types of filters, or even interchangeable scales for respective filters.

In order to effect accurate operation of the apparatus, adjustment may be made to compensate for the speed of motor 14 which may vary due to variation in line voltage and also for ambient air pressure. Such adjustment, that is, setting the scale precisely to a predetermined position prior to testing, can readily be accomplished by rotation of knob 96 and consequent rotation of spring 70 together with shaft 47, the torque of manual rotation of the knob being thus transmitted through the bracket 64, and spring 70 to shaft 47, and scale 104, in a readily understood manner.

In order to provide considerable versatility for testing all kinds of cylinders, speed control of motor 14 may be had so as to vary the degree of air flow. In such case, the scale and/or charts will be suitably prepared for different motor speeds.

Finally, while I have shown an air tunnel cylinder 35 as being a practical and convenient mode of channelling air through the device, it will be apparent that the construction could be such as to eliminate the cylinder and merely have air pulled through the entire housing. However, I believe that the use of the air tunnel cylinder provides a better arrangement by reducing turbulence.

The essential element of my novel tester is that it measures the air flow by utilizing a constant opening of constant cross-section with no variation in the restriction on the flow of air to the air cleaner itself. Prior methods of measuring flow have utilized dampers which varied the opening, and thus imposed an additional and unforseeable change in the rate of flow. In my novel device the restriction on air flow caused by the measuring element is constant regardless of the amount of air flowing.

Having thus described my invention, I am aware that various changes may be made without departing from the spirit thereof, and, accordingly, I do not seek to be limited to the precise illustration herein given except as set forth in the appended claims.

I claim:

1. In an air filter testing device, a fan for effecting air flow through a filter to be tested, and a reaction fan blade, disposed within said air flow, movable in predetermined degree by impingement of said air flow thereon depending on the mass rate of said air flow through said filter, said fan and said reaction fan blade being axially aligned, the pitch of said fan and said reaction fan blade being opposite to each other, bias means connected to said reaction fan blade effecting rotary bias thereon in a direction opposite to the rotary force acting on said reaction fan blade due to said air flow, horizontally disposed means constructed and operatively positioned for the gravity support of a filter being tested.

2. In an air filter testing device, a fan for effecting air flow through a filter to be tested, and a reaction fan blade, disposed within said air flow, movable in predetermined degree by impingement of said air flow thereon depending on the mass rate of said air flow through said filter, said fan and said reaction fan blade being axially aligned, the pitch of said fan and said reaction fan blade being opposite to each other, bias means connected to said reaction fan blade effecting rotary bias thereon in a direction opposite to the rotary force acting on said reaction fan blade due to said air flow, including a cylindrical scale carried by said reaction fan blade and integrally rotative therewith, horizontally disposed means constructed and operatively positioned for the gravity support of a filter being tested.

3. In an air filter testing device, a fan for effecting air flow through a filter to be tested, and a reaction fan blade disposed within said air flow, movable in predetermined degree by impingement of said air flow thereon depending on the mass rate of said air flow through said filter, said fan and said reaction fan blade being axially aligned, the pitch of said fan and said reaction fan blade being opposite to each other, bias means connected to said reaction fan blade effecting rotary bias thereon in a direction opposite to the rotary force acting on said reaction fan blade due to said air flow, including a cylindrical scale carried by said reaction fan blade and integrally rotative therewith, a shaft on which said reaction fan blade is mounted including means for adjusting an initial setting of said scale comprising a bracket mounted for rotation about the axis of rotation of said reaction fan blade and said shaft, said biasing means comprising a spring intermediate said bracket and said shaft and manually operable means for rotating said bracket.

4. In an air filter testing device, a fan for effecting air flow through a filter to be tested, and a reaction fan blade, disposed within said air flow, movable in predetermined degree by impingement of said air flow thereon depending on the mass rate of said air flow through said filter, said fan and said reaction fan blade being axially aligned, the pitch of said fan and said reaction fan blade being opposite to each other, bias means connected to said reaction fan blade effecting rotary bias thereon in a direction opposite to the rotary force acting on said reaction fan blade due to said air flow including a cylindrical scale surrounding and carried by said reaction fan blade and integrally rotative therewith, a shaft on which said reaction fan blade is mounted, including means for adjusting an initial setting of said scale comprising a bracket mounted for rotation about the axis of rotation of said reaction fan blade and said shaft, said biasing means comprising a spring intermediate said bracket and said shaft, and manually operable means for rotating said bracket, said manually operative means comprising a rotative worm, said bracket having an extending portion terminating in a worm gear segment engaging said worm, whereby rotation of said worm effects rotation of said bracket for effecting initial position of said scale.

5. In an air filter testing device, means for effecting air flow through a filter to be tested, and means, disposed within said air flow, movable in predetermined degree by impingement of said air flow thereon depending on the mass rate of said air flow through said filter, said means for effecting air flow comprising a fan blade, said means disposed within said air flow comprising a reaction fan blade, the pitch of said fan and said reaction fan blade being opposite to each other.

6. In an air filter testing device, means for effecting air flow through a filter to be tested, and means, disposed within said air flow, movable in predetermined degree by impingement of said air flow thereon depending on the mass rate of said air flow through said filter, said means for effecting air flow comprising a fan blade, said means disposed within said air flow comprising a reaction fan blade, the pitch of said fan and said reaction fan blade being opposite to each other, said fan and said reaction fan blade being coaxial, including an air tunnel cylinder disposed therebetween and coaxial therewith, a housing, an aperture in a wall of said housing co-axial with said air tunnel cylinder and over which aperture an air filter may be disposed for test substantially enclosing said aperture.

7. In an air filter testing device, means for effecting air flow through a filter to be tested, and means, disposed within said air flow, movable in predetermined degree by impingement of said air flow thereon depending on the mass rate of said air flow through said filter, said means for effecting air flow comprising a fan blade, said means disposed within said air flow comprising a reaction fan blade, the pitch of said fan and said reaction fan blade being opposite to each other, said fan and said reaction fan blade being coaxial, including an air tunnel cylinder disposed therebetween and coaxial therewith, a housing, an aperture in a wall of said housing co-axial with said air tunnel cylinder and over which aperture an air filter may be disposed for test substantially enclosing said aperture, including a scale carried by said reaction fan blade, said scale being cylindrical and secured at the ends of said reaction fan blade and rotative therewith, said scale forming a continuation of said air tunnel cylinder and an aperture in said housing through which a portion, at least, of said scale is visible to an operator.

References Cited in the file of this patent
UNITED STATES PATENTS

| | | |
|---|---|---|
| 1,014,842 | Muckenfuss | Jan. 16, 1912 |
| 1,795,588 | Wilson | Mar. 10, 1931 |
| 2,157,135 | Little et al. | May 9, 1939 |
| 2,207,747 | Manarik et al. | July 16, 1940 |